United States Patent [19]

Pisano

[11] 3,745,466

[45] July 10, 1973

[54] ELECTROSTATIC SHIELD ALLOWING SUBSTANTIALLY COMPLETE ELECTROMAGNETIC PROPAGATION FROM A TRANSMITTER

[75] Inventor: Alan D. Pisano, Revere, Mass.

[73] Assignee: General Electric Company, Schenectady, N.Y.

[22] Filed: Jan. 20, 1972

[21] Appl. No.: 219,246

[52] U.S. Cl. ............... 325/119, 310/68 C, 325/105, 325/133, 325/140, 325/150, 340/192

[51] Int. Cl. ............................................. H04b 1/16

[58] Field of Search .................... 325/101, 105, 119, 325/133, 140, 150, 28, 26, 357, 496; 179/82; 317/101; 310/68 R, 68 B, 68 C, 66, 67, 264; 73/343, 362; 340/192, 195; 343/842, 841; 174/35

[56] References Cited

UNITED STATES PATENTS

| | | | |
|---|---|---|---|
| 3,268,880 | 8/1966 | Miller | 73/362 |
| 3,452,597 | 7/1969 | Grady, Jr. | 73/343 |
| 3,310,736 | 3/1967 | Bayly et al. | 179/82 |
| 1,811,357 | 6/1931 | Karplus | 325/496 |

*Primary Examiner*—Robert L. Griffin
*Assistant Examiner*—Marc E. Bookbinder
*Attorney*—William C. Crutcher et al.

[57] ABSTRACT

A nickel mesh shield comprised of small closed loops surrounds a transmitter and radiating loop to provide an electrostatic shield for the transmitter. The mesh shield provides substantially no electromagnetic radiation attenuation of the radio frequency transmitted by the transmitter.

10 Claims, 5 Drawing Figures

ELECTROSTATIC SHIELD ALLOWING SUBSTANTIALLY COMPLETE ELECTROMAGNETIC PROPAGATION FROM A TRANSMITTER

BACKGROUND OF THE INVENTION

The present invention relates to new and improved shielding utilized in the protection of transmitters. More particularly, the invention relates to a new and improved closed mesh, which shields a transmitter from electrostatic gradients incurred during the use of the transmitter for remote reading temperature sensing, yet providing substantially no electromagnetic or radio frequency radiation attenuation from the transmitter at the transmitter broadcasting frequency.

The present invention may be utilized advantageously to protect a tunnel diode transmitter such as is disclosed in U. S. Pat. No. 3,260,116, issued to R. F. Grady, Jr., and assigned to the assignee of the present invention. The Grady patent referred to herein utilizes a miniaturized tunnel diode oscillator having a temperature dependent frequency of oscillation disposed in contact with a current carrying conductor, such as an armature bar or the like subjected to high potential testing of the armature bar or the like.

Since the tunnel diode is a low-impedance, low-current device, its protection from possible damage due to high discharge currents to ground in a highly charged and ionized environment, such as incurred during high potential testing of armature bars or the like, has been a problem.

Prior art methods of shielding proved inadequate in that, although providing effective electrostatic shielding, the prior art shielding would develop excess heat due to eddy currents and would produce hot spots on the armature bars, which could effect the reliability of the tunnel-diode transmitter. The prior art shields would also shield the electromagnetic radiation propagation of the radio frequency transmitted by the transmitter, which is the very signal which must be sensed.

A prior art attempt to solve this problem utilized a Faraday shield which eliminated closed loops and thus eliminated eddy currents. However, the Faraday shield was found to be impractical for any small scale application in that Faraday shields are composed of many hair-like strands of wire which are formed so that none of them touch each other. The Faraday shield is most difficult to install.

These problems are overcome by my invention, which provides for use of a fine closed nickel mesh shield of predetermined thickness and predetermined hole geometry to provide electrostatic protection to the tunnel diode transmitter and which shield does not interfere with the electromagnetic radiation propagation of the radio frequency energy from the transmitter.

SUMMARY OF THE INVENTION

It is an object of this invention to provide a shield which will pass the radio frequency radiation of a transmitter and simultaneously shield the transmitter from the electrostatic gradients which may occur during high potential testing of electrical conductors such as armature bars.

It is a further object of this invention to provide an easy-to-install, fine closed loop nickel mesh shield for a transmitter in the environment of an armature bar subject to high potential testing.

More particularly, it is an object of this invention to provide a new and improved closed loop nickel mesh having a predetermined thickness and hole geometry for the electrostatic protection of a transmitter and for effecting substantially no attenuation of radiation from the transmitter at the transmitter broadcasting frequency.

Briefly stated, in accordance with one aspect of the invention, the foregoing objects are achieved by forming and utilizing a fine nickel mesh shield comprising closed loops having a predetermined thickness and a predetermined hole geometry.

The invention, both as to its organization and principle of operation, together with further objects and advantages thereof, may better be understood by reference to the following detailed description of an embodiment of the invention when taken in conjunction with the accompanying drawings in which:

DESCRIPTION OF THE PREFERRED EMBODIMENT

Figure 1:
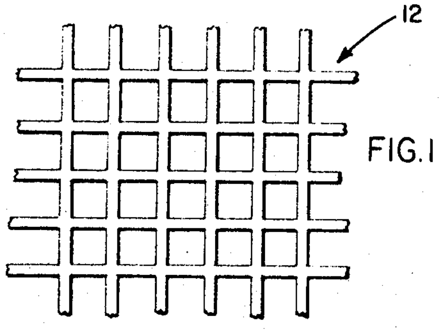
FIG. 1 is an enlarged view of a closed square loop mesh shield in accordance with this invention.

FIG. 1 is an enlarged view of a closed square loop shield mesh 12 formed of a conductive material such as nickel in accordance with the present invention. Nickel has an extremely low resistivity, on the order of $10^{-5}$ ohm-cm and is a good electrostatic shield. When the nickel mesh is formed in accordance with this invention, negligible radiation attenuation is offered to a time variant magnetic field ranging from a frequency lower than 60 Hz. to a frequency higher than 1 MHz.

The desirable electromagnetic radiation properties achieved by this invention depend on the type of material, its thickness and the hole geometry of mesh 12.

First as to thickness, it is well known in the art that an effective means of controlling electromagnetic radiation at radio frequencies is through shields of good conductors, such as copper or aluminum. Magnetic flux penetrates such a shield only with great difficulty because as the flux cuts into the conducting material it produces eddy currents that oppose the penetration. Therefore, if the thickness is a number of times the skin depth, relatively all of the radio frequency will be attenuated. Conversely, I find that if a shield is so constructed to have a smaller thickness than the skin depth of the material being used, this will be a factor, but not the only factor, in minimum attenuation of radio frequency radiation by the shield.

Skin depth for nickel may be calculated by utilizing the formula:

$$E = 1.98 \sqrt{R/u_r f}), \text{ inches}$$

where $R$ is the resistivity for nickel taken as $10 \times 10^{-6}$ ohms-cm $u_r = 1$, where $u_r$ = relative permeability $f$ = frequency in MHz.

Utilizing the foregoing formula, the skin depth as calculated for nickel at a frequency of 1 MHz. is approximately 6.22 mils. When calculated for 10 MHz., the skin depth for nickel is approximately 2.0 mils.

It is in accordance with my invention that I choose to utilize nickel mesh having a convenient thickness of 0.5 mils, a thickness which, while less than the skin depth of nickel, would still undesirably attenuate the electromagnetic radiation without adequately shielding from electrostatic gradients if not for factors mentioned below.

An added factor which gives the desired magnetic shielding characteristics to mesh 12 is an additional physical parameter of the hole geometry. The hole geometry is the ratio of the hole area to the total area. The hole geometry is approximately 62,500 to 1,000,000 holes per square inch in a square array and provides a transmission characteristic of slightly greater than 50 percent. This hole geometry causes any eddy currents produced by the electromagnetic radiation as it passes mesh 12 to travel in very small loops in mesh 12. The current in adjacent loops travels in the same direction, but in the metal spaces between loops the current travels in opposing directions tending to cancel the magnetic effect and results in substantially no loss of energy. The effective resistance of a shield to eddy currents caused by electromagnetic radiation propagation is thus increased greatly over prior art shieldings. Because of the hole geometry utilized in this invention, the thickness of the shield may be greater than that of the skin depth if a more rigid mechanical structure is desired. Therefore, the magntic properties of mesh 12 utilized in practicing the invention depend on the type of material, its thickness, and the hole geometry. The thickness and hole geometry may be calculated according to formulas hereinbefore set forth.

Figure 2:
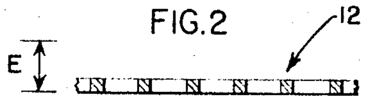
FIG. 2 is a sectional view of FIG. 1 showing the thickness of the mesh shield in accordance with this invention.

FIG. 2 shows a sectional view of mesh 12 of FIG. 1 to illustrate that the thickness of mesh 12 is less than the skin depth E in accordance with this invention.

Mesh 12 may be formed by being stamped, as shown in FIG. 2, or formed in a woven pattern as is well known in the art. Also, the wire strands which form mesh 12 are shown as being circular; however, any conventional shape will do.

Figures 3, 4, 5:
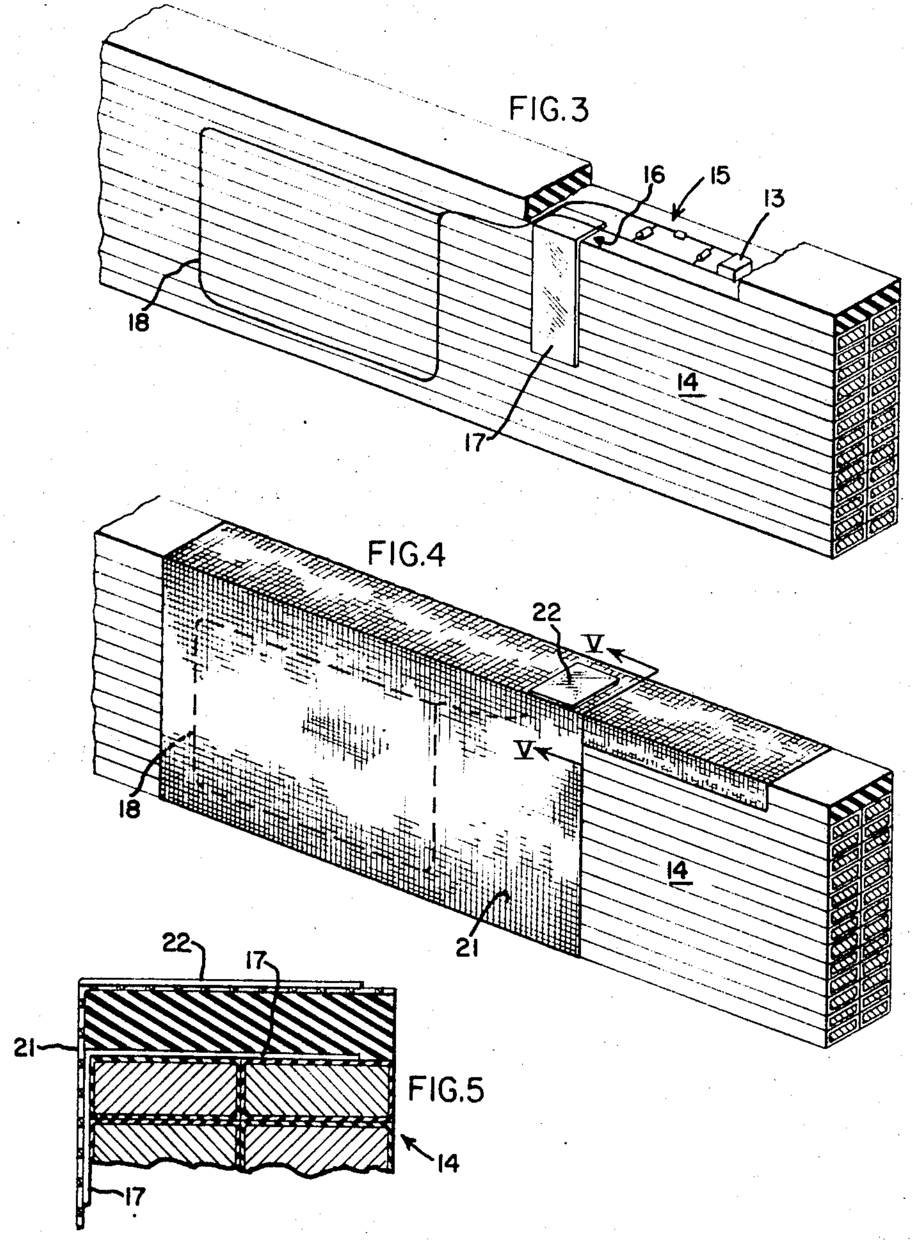
FIG. 3 is a diagrammatic illustration of the assembling of a transmitter into an armature bar as utilized with this invention.
FIG. 4 is a diagrammatic illustration of a transmitter encased in an armature bar protected by a closed loop mesh shield formed in accordance with this invention.
FIG. 5 is a sectional view of FIG. 4, taken along line VV in accordance with this invention.

FIGS. 3, 4 and 5 show the application of this invention in the environment of thermal testing of armature bars in a dynamoelectric machine. The embodiments in the following figures in no way limit the scope of the invention but are cited as merely demonstrating a specific application.

FIG. 3 shows a transmitter 13 proximate to a copper armature bar 14, the temperature whereof is to be monitored. For proper installation, a space 15, substantially dimensioned to accept a transmitter 13, is formed in the top of bar 14.

A small area 16 of insulation previously deposited on the top of bar 14 is scraped off near the end of space 15. A Nichrome strip 17 or its equivalent is fastened at area 16 with a suitable solder. This solder makes an electrical connection between the Nichrome strip 17 and the copper armature bar 14.

The transmitter 13 is then placed in the space 15. A radiating loop 18 is sandwiched between two pieces of epoxy-impregnated glass cloth or the like and fastened to the bar 14 on the same side as the Nichrome strip 16. The loop 18 is positioned so that it is not directly under transmitter 13 to allow an insulating material to flow down the side of the bar 14 and not ruin the loop 18. The Nichrome strip 17 is bent to lie adjacent to and out of contact respective the loop 18.

FIG. 4 shows a nickel mesh 21, formed in accordance with the invention, covering both the transmitter under Nichrome strip 22 and loop 18 disposed on bar 14. A material such as an epoxy-impregnated glass cloth or the like is placed over the mesh 21 to hold the mesh 21 in place and protect it during insulation. The bar 14 is then insulated as usual and installed in a dynamoelectric machine in a manner well known in the art.

FIG. 5 shows a more detailed view of the mesh 21 taken through line VV in FIG. 4. After the armature bar 14 has cooled, the Nichrome strip 17 is bent over the top of armature bar 14 with a small Nichrome strip 22 to form a sandwich around nickel mesh 21. The two pieces of Nichrome 17 and 22 which surround the mesh 21 are spot-welded together so that the resulting sandwich lies on top of bar 14.

By providing a closed loop mesh of nickel formed in accordane with my invention and having a predetermined thickness and a predetermined hole geometry around a transmitter mounted respective an armature bar, it will provide a reliable electrostatic shield without disturbing the electromagnetic radiation from a transmitter.

While a specific application and embodiment of the invention has been shown and described, it will be apparent to those skilled in the art that many more modifications are possible without departing from the inventive concept herein described. The invention, therefore, is not to be restricted except as is necessary by the prior art and by the spirit of the appended claims.

What is claimed is:

1. In a dynamoelectric machine having a winding subject to electrostatic radiation during high potential testing wherein a transmitter is to be utilized for remote reading temperature sensing, the combination of:

a transmitter in proximity to said winding and including a radiating loop;

a mesh formed of a conductive material, comprising a plurality of closed loops shielding said transmitter;

said mesh having a predetermined thickness and a predetermined hole geometry providing an attenuation of the electrostatic radiation produced by the high potential testing toward said transmitter shielded by said mesh, and passing substantially complete electromagnetic radiation propagation from said transmitter outward of said shielded transmitter.

2. The combination as in claim 1 wherein said transmitter is a tunnel diode transmitter.

3. The combination as in claim 1 wherein said thickness of said mesh is less than the skin depth of said conductive material of said mesh.

4. The combination as in claim 1 wherein said closed loops form squares.

5. The combination as in claim 1 wherein said hole geometry comprises on the order of 62,500 holes per square inch in a regular array.

6. The combination as in claim 1 wherein said transmitter broadcasting frequency is 1 MHz.

7. The combination as in claim 1 wherein said conductive material is nickel.

8. The combination as in claim 7 wherein said thickness of said mesh is in the order of magnitude of 0.5 mil.

9. The combination as in claim 8 wherein said hole geometry results in a ratio of hole area to total area in the order of magnitude of 50 percent.

10. The combination as in claim 9 wherein said winding is an armature bar mounted in said dynamoelectric machine, and wherein said transmitter is disposed in a heat-sensing relationship with said armature bar.

* * * * *